INVENTOR
FREDERIC H. MIDDLETON
BY
Greist, Lockwood, Greenawalt & Dewey
Attys.

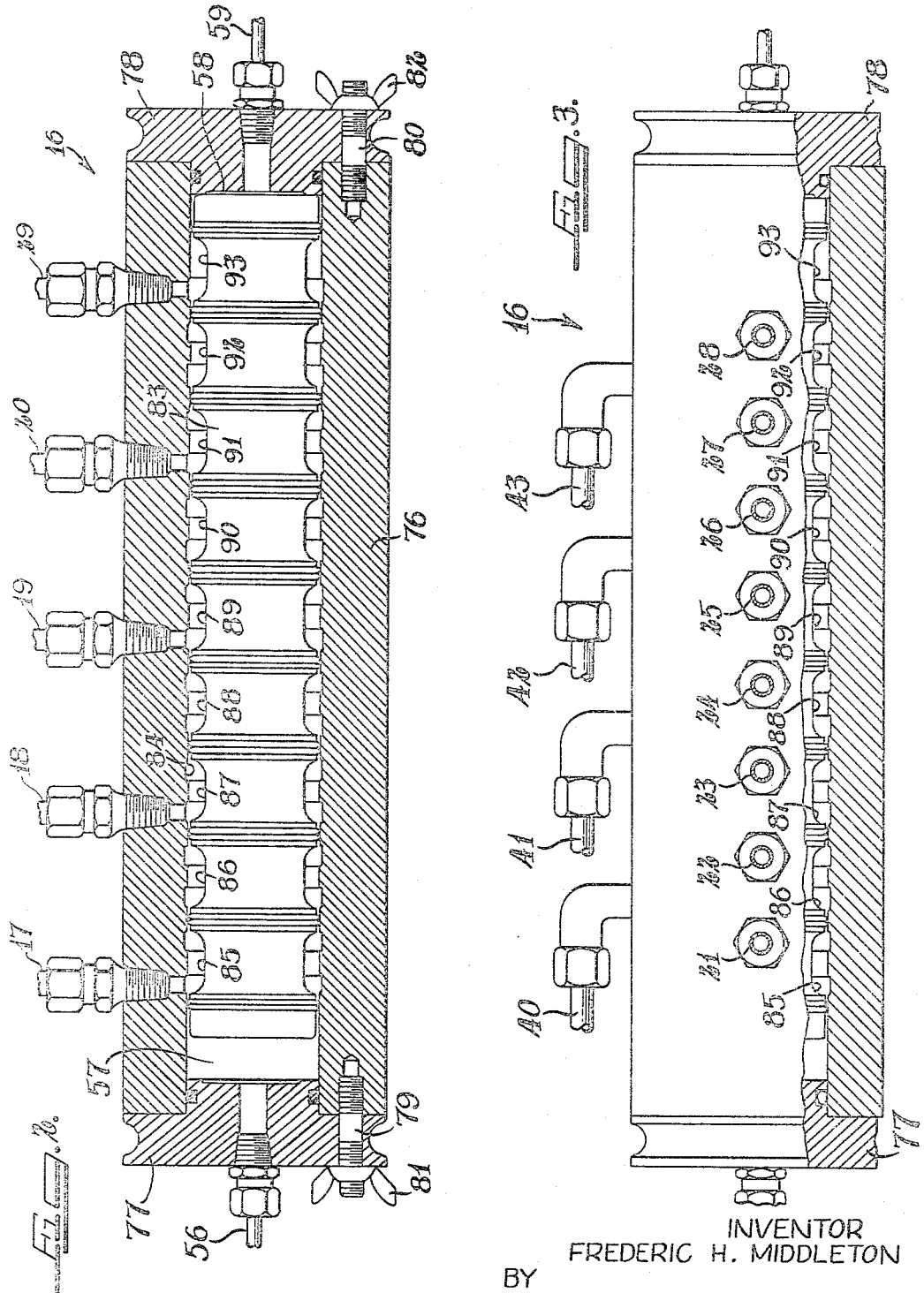

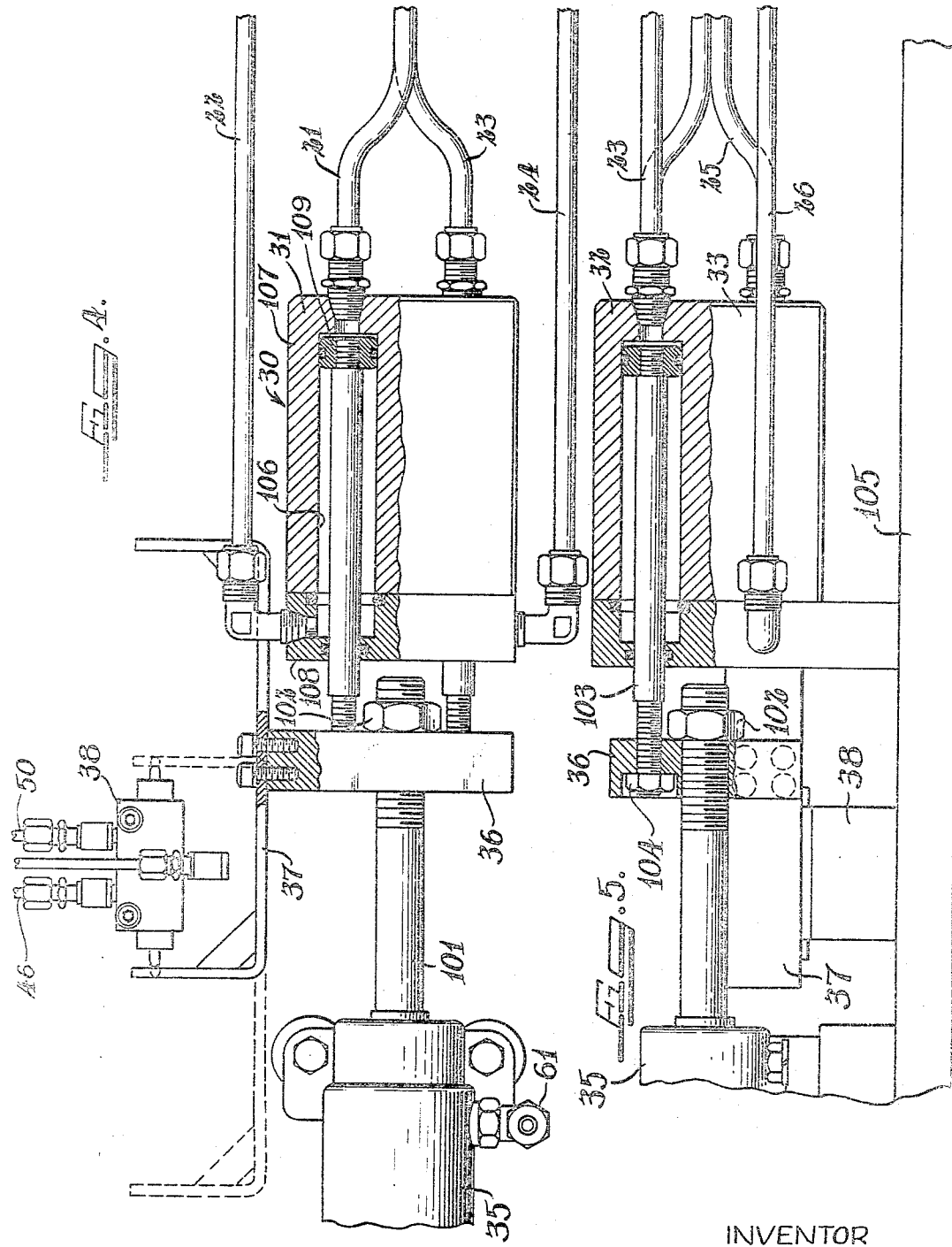

United States Patent Office 3,311,271
Patented Mar. 28, 1967

3,311,271
MULTI-CHANNEL METERING SYSTEM
Frederic H. Middleton, Madison, Wis., assignor to Oscar Mayer & Co., Inc., Chicago, Ill., a corporation of Illinois
Filed Apr. 8, 1965, Ser. No. 446,576
8 Claims. (Cl. 222—330)

This invention relates to handling of flowable material and more particularly is directed to a multi-channel material handling system which controls the quantity and rate of delivery of the material handled in a positive and reliable manner.

The metering system of the present invention has general application wherein positive displacement of flowable material to maintain uniformity in quantity and rate is a prerequisite. By way of illustration, the system has particular utility in the process of forming skinless sausages as disclosed in the copending application, Ser. No. 198,040, filed May 28, 1962, now abandoned. In such process, swollen collagen fibers are metered into a sausage casing during the stuffing operation. The casing is subdivided into links and controlled moisture removal is carried out so that the collagen forms a deposited "skin" permitting the casing to be stripped while the individual sausage links retain their shape and can be handled for packaging without breaking.

The collagen supply must be continuous and uniform and yet readily selectively controllable as it is but an adjunct of the basic process, namely, stuffing. In other words, the basic stuffing operation is controlling and as practiced requires selective interruption for casing replacement and the like. The metering system of this invention accommodates such selective interruption of any basic process without interference with the continuous nature of its own operation.

Accordingly, one of the principal objects of the present invention is to provide a multi-channel metering system adapted to deliver a flowable material under conditions providing for uniformity such as in quantity and rate.

It is a further object of the invention to provide a positive displacement metering system particularly adapted for supplying collagen to sausage stuffing horns in a uniform and continuous manner, the system being selectively controllable in response to variations in the primary sausage stuffing operation without interfering with efficient continuity of system operation.

It is a further object of this invention to provide a new and improved multi-channel metering system in which the component parts are so designed that they may be readily disassembled for cleaning.

Further and fuller objects will become readily apparent when reference is made to the accompanying drawings wherein:

FIG. 2 is an enlarged cross sectional view of the metering valve of the present invention;

FIG. 3 is an elevational view of the valve of FIG. 2 with parts in section to illustrate the arrangement of the outlet nozzle groupings;

FIG. 4 is a top plan view of the metering pump used in the system of FIG. 1 with portions in section to illustrate details; and FIG. 5 is a side elevational view of the pump shown in FIG. 4 with parts in section to illustrate details of the pump and driving connection.

Figure 1:
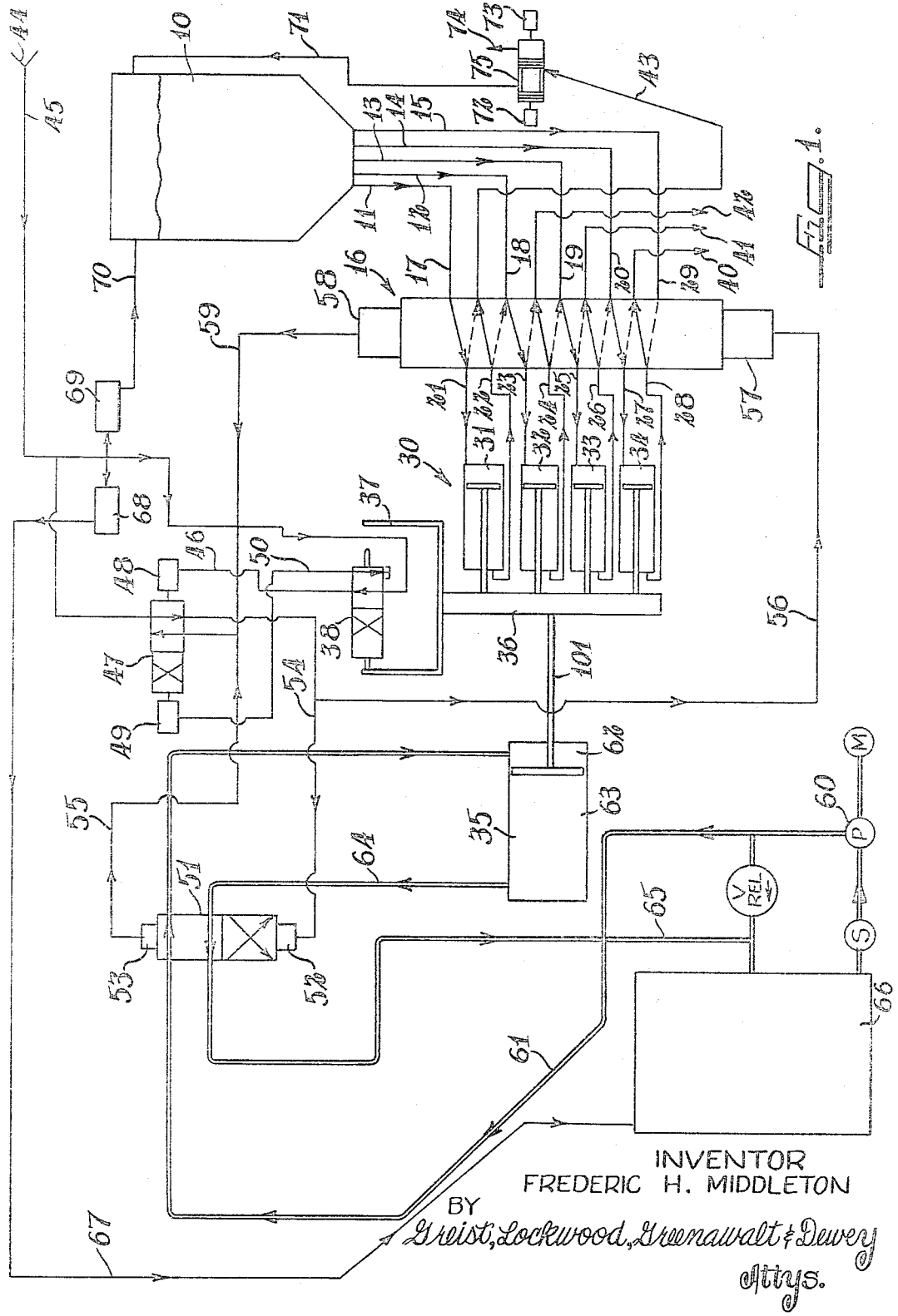
FIG. 1 is a schematic diagram of the metering system of the present invention.

For convenience of description the present metering system will be described in connection with the metering of collagen to a plurality of stuffing horns. Obviously, the system is well suited for metering other emulsified or flowable products. For example, it may be used in a pumping and metering system for slurries which contain solids or the like and with which positive displacement pumping is desirous. The reference to collagen and sausage stuffing is therefore not intended to be limiting inasmuch as it establishes a proper frame of reference in which to more clearly present and describe the salient features of the present invention.

Referring now to FIG. 1, the multi-channel metering system of the present inventioin includes a hopper 10 which is adapted to provide a source of supply for the particular flowable product to be metered. A plurality of product supply lines 11, 12, 13, 14 and 15 are fed to a multi-channel control valve indicated generally at 16. The multi-channel valve 16 includes inlet portions 17, 18, 19, 20 and 29 which through shifting of the valve spool can be made to selectively communicate with certain of the outlet lines 21–28. The outlet lines 21–28 communicate with a multi-channel pump arrangement 30 which has four channels indicated schematically by pumping cylinders 31, 32, 33 and 34. The multi-channel pump 30 may be driven by suitable means, preferably the two-way acting hydraulic cylinder or fluid motor 35 driving a cross head arrangement 36 joined to the piston rod of the pistons slidably received in the cylinders 31–34.

The cross head 36 mounts a U-shaped limit switch actuating member 37 which is shiftable with the cross head 36 to engage oppositely facing plungers on a limit switch 38. The limit switch 38 serves to control the flow of fluid to the main air control valve 47 which in turn controls the main valve in the hydraulic line leading to the fluid motor 35.

The multi-channel pump 30 is two-way acting and therefore one half of the outlet lines 21–28 from the multi-channel valve 16 serves as supply lines from the hopper 10 to the pump 30 through one half of the cycle. The remaining half serve as exhaust lines through this half of the cycle supplying the product to the dispensing means indicated by arrows at 40, 41, 42, and 43 from the pump. At this point it can be appreciated that the outlets 21–28 are arranged in pairs to correspond with each channel of the pump 30. By referring to the symbols on the multi-channel valve 16 in FIG. 1, it can be appreciated that one outlet line is supplying the product to the intake side of the cylinder while the adjacent outlet line is in communication with the outlet side of the pump to direct flow to the dispensing means. A more detailed consideration of this feature will be given hereinafter, when the operation of the system is described.

An air control system is indicated generally at 44 and may be supplied from any suitable source through the main supply line at 45 for selective distribution in a manner to become apparent. Primary control of the air is maintained by means of the limit switch valve indicated generally at 38. When the pumps are in the position shown, the air supply 45 communicates through line 46 with air valve 47 having air operated pilot cylinders 48 and 49 at opposite ends. When the line 46 is in communication with the cylinder 48, the opposite end of the valve 47, denoted by the cylinder 49, is vented through the limit switch valve 38 by a line 50 to atmosphere to permit the valve 47 to shift to the position shown.

The second air valve supplies full line pressure from the main supply line 45 to a hydraulic valve 51 actuated by air cylinders 52 and 53. With the valve in the position shown, line 54 is placed in communication with pilot cylinder 52 while pilot cylinder 53 is vented through line 55 to atmosphere through the valve 47. A branch line 56 is in communcation with a pilot cylinder or fluid motor 57 operating the multi-channel valve 16. The opposite end of the multi-channel valve 16 is also provided with a pilot cylinder 58 which has a branch line 59 vented to atmosphere through the valve 47. Accordingly, the multi-channel valve 16 will be shifted between axial limits to control flow as will be explained more completely hereinafter in conjunction with FIGS. 2 and 3.

The hydraulic valve 51 serves as the main control valve for operating the fluid motor 35 controlling the flow of fluid to the appropriate chamber when the piston reaches its limit of travel within the cylinder. In the position shown the valve 51 has been shifted to feed hydraulic fluid from a pump 60 through line 61 to the chamber 62 of the fluid motor 35. The opposite chamber 63 is vented through line 64 to the valve and line 65 to a reservoir 66. The reservoir 66 is maintained under pressure through a line 67 fed from a regulator 68 which in turn is connected to a supply line 45. An additional regulator 69 maintains the hopper 10 under constant pressure to supply line 70.

A return line 71 leads to the hopper 10 from the valve 75 which may be actuated by a pilot cylinder 72 or a manual control 73 at the opposite end. The stuffing horn indicated generally at 74 may be placed in communication with the product metered or flow may be cut off and fed directly back to the hopper 10 by operation of the valve 75, which as noted may be automatically or manually operated. Such operation however will not interfere with the continuity of operation of the remaining lines.

Referring now to FIGS. 2 and 3 the novel construction of the multi-channel valve will be described. The valve 16 includes a tubular housing having end caps 77 and 78 closing off the opposite end portions. As illustrated a suitable seal means such as quad-rings, O-rings or the like may be used to form a fluidtight fit between the end caps 77 and 78 and the tubular housing 76. Suitable means such as the studs 79 and 80 and cooperating wing nuts 81 and 82 respectively, may be provided to removably hold the end caps 77 and 78 on the tubular housings 76. An annular spool 83 is slidably received within the central bore 84 of the tubular housing and the end portions of the spool 83 form with the tubular housing and respective end caps the chambers 57 and 58 which were briefly described in conjunction with FIG. 1. The spool 83 is provided with a series of uniformly reduced diameter portions 85–93 which form with the internal bore 84 of the housing 76 a plurality of annular chambers. Depending upon the position of the spool 83, the inlet lines 17, 18, 19, 20 and 29 are in communication with the outlet lines 21, 23, 25, 27, or 22, 24, 26 and 28 shown in FIG. 3 via the spool chambers. When the spool is in the position shown, the formal alternative is true and outlet lines 22, 24, 26 and 28 are in communication with the stuffing lines 40–43 and the associated pump which is pumping.

Suitable sealing means may be provided between the respective annular chambers formed by the reduced portions on the spool 83 to isolate one chamber from the other. It can be appreciated that disassembly of the multi-channel valve 16 may be accomplished through removal of the wing nuts and the lines 56 and 59. The spool may then be removed for cleaning and the bore 84 easily flushed or cleaned by any desired method.

When the spool 83 is shifted to the opposite extreme, that is, with the left-hand end against the end cap 77, lines 18, 19, 20 and 29 communicate with lines 22, 24, 26 and 28 while line 17 is blocked. Under these conditions, lines 21, 23, 25 and 27 are in communication with the stuffing lines 40–43 respectively. Shifting of the valve is accomplished in a manner to become apparent when the full operation of the system is described.

The detailed operational features of the multi-channel product pump 30 may be best described with reference to FIGS. 4 and 5 wherein like parts are indicated by like reference numerals. The fluid motor 35 is shown fragmentarily having a piston rod 101 extending through a plate-like cross head 36, which may be threaded and firmly held in place by a suitable means such as the lock nut 102. As noted above, the multi-channel pump 30 is provided with a plurality of cylinders (four in the embodiment shown) having their respective piston rods joined to the cross head 36 by means of a threaded connection and lock nut such as the one illustrated at 104 on the piston rod 103. The piston rods on each of the cylinders 31, 33 and 34 is attached to the cross head 36 in a similar manner.

The limit switch actuator 37 is carried on the cross head 36 by means of cap screws or the like with one extreme position being indicated in the solid line showing of FIG. 4 while the opposite position at the end of reciprocation of the piston rod 101 is illustrated in phantom lines. The flow of air is controlled by the limit switch valve 38 which is operated by the actuator 37. The pumps may be mounted on a housing or plate such as that illustrated at 105 which also provides a mounting for the fluid motor 35.

The multi-channel pump 30 illustrated includes the four identical cylinders two of which are illustrated in FIGS. 4 and 5. Each cylinder is provided with an annular bore 106 formed in the cylinder housing 107 with the end closed by the end cap 108. The piston rod reciprocates the piston head 109 between opposite ends of the wall and responds to reciprocation of the fluid motor 35. As noted previously, when the piston head 109 is moving in the chamber 106 it forces the product out the associated line connected to the side in which the volume is diminishing. The opposite side of the chamber 106 where the volume is increasing is simultaneously filling through the line in communication with it. Each cylinder of the multi-channel pump 30 is operable on each cycle of reciprocaton so that flow is continuous and at a uniform rate.

As illustrated in FIG. 4, the cylinders 31 and 33 are disposed with the former over the latter with the same arrangement applicable to the cylinders 33 and 34. Obviously, any desired arrangement may be provided which is suitable, however, it is beneficial to have a single housing or cylinder block wherever possible as it minimizes the number of parts to be cleaned.

In operation, the pistons of the multi-channel pump 30 are reciprocated at the same speed and in the same direction by the fluid motor 35 through the cross head 36. At the end of the stroke of the pump, the limit switch actuator 37 actuates the valve 38 to shift the hydraulic pressure to the appropriate chamber 62 or 63 of the fluid motor 35 causing the pump to reverse direction. The discharge of the pumped product at the horn has only a slight pause to indicate a change of direction.

For all practical purposes, delivery rates remain the same in spite of the fact that one chamber is diminished in volume by the volume of the piston rod. The ratio of cylinder diameter to rod diameter is the same on each channel of the pump 30 and the fluid motor 35 to permit the fluid motor 35 to move at an increased rate of travel when the hydraulic fluid is being fed to the chambers 62. Since the travel of the piston rod 101 increases, the rate of travel of the individual piston rods in each channel of the multi-channel pump 30 also increases to maintain the product fed out of lines 22, 24, 26 and 28 at a rate which is substantially identical to the rate experienced when the remaining lines are in service. Accordingly, the positive displacement is substantially constant regardless of direction.

The hydraulic system primarily shown in the lower left-hand corner of the diagram of FIG. 1 may consist of a gear-type oil pump 60 driven by a variable speed motor reducer and a suitable filtering arrangement to insure that the oil is free from foreign material. The oil under pressure is fed through line 61 and the valve 38 to the chamber of the fluid motor 35.

Depending of course on the chamber supplied and the position of the piston rod 101, the piston will actuate the cross head 36 driving the individual cylinders 31–34 to meter the collagen to the stuffing horns represented by the lines 40–43. Reversal of the direction of the fluid motor 35 is accomplished in the manner described above through the actuation of the main hydraulic valve 51. When the motor reaches the end of its stroke, the limit switches on the valve 38 are actuated causing a shifting of the valve 47 feeding pilot cylinders 52 and 53 which control the main hydraulic valve 51. Obviously, reciprocation of the piston 101 between defined limits will be repetitive so long as oil under pressure is supplied from the hydraulic pump to the fluid motor 35.

Further details of the operation of the multi-channel metering pump 30 are best understood with reference to FIGS. 1–3. Each of the channels 31–34 in the multi-channel pump 30 is double acting through a conventional porting arrangement permitting one chamber of each cylinder to be filling while the opposite chamber is metering the collagen to the stuffing lines 40–43 through the multi-channel valve 16. Since all pistons are driven from the same source, the rate of linear movement is identical for each and thus the output at each stuffing horn is identical also. When the fluid motor 35 reaches its limit, the multi-channel spool valve 16 is automatically shifted to place the appropriate chamber in communication with the stuffing horn through operation of the pilot cylinders 57 and 58. In this manner continuity of flow is assured.

From the foregoing it can be appreciated that the present system, while being of a comparatively simple design, serves to provide the uniform or metered flow of material. The component parts contacting the product handled are of a design which is sanitary, and also easily cleaned. Highly viscous materials can be used in the system and entrained matter will not interfere with the operation of the pump as has been experienced in prior art type systems. High pressures may also be developed through the unique control arrangement.

From the foregoing it is obvious that various modifications may be made without departing from the inventive concepts embodied herein. Therefore, only such limitations should be imposed as are indicated by the spirit and scope of the appended claims.

I claim:
1. A metering system for use in supplying a flowable material in a continuous manner through multiple channel delivery means under uniform delivery pressure conditions, said system comprising material supply means provided with multiple channel outlet means, a plurality of positive displacement and multiple stage pump means, motor means to motivate said multiple stage pump means to simultaneously accumulate material therein and discharge accumulated material therefrom at a uniform rate, multiple channel delivery means for said pump means to obtain a continuous supply of material therefrom, and selectively operable control valve means for interconnecting said outlet means with selected stages of said pump means while simultaneously interconnecting said delivery means with the remaining stages of said pump means, whereby material is continuously supplied to said pump means for accumulation in said selected stages thereof while said pump means is continuously delivering material accumulated in said remaining stages to said delivery means.

2. The system of claim 1 wherein operating means is connected to said control valve means and to said pump means to shift said valve means in response to empty and full conditions of the stages of said pump means to maintain continuous flow of said material through said system.

3. The system of claim 1 wherein recycling material flow control means form a part of each of said delivery means to permit selective recycling of said material to said supply means without interrupting continuous operation of said system.

4. The system of claim 1 wherein said pump means includes reciprocating pistons confined in closed end cylinders which to alternating sides of said pistons define material discharge and accumulation zones.

5. The system of claim 1 wherein said pump means includes reciprocating pistons confined in closed end cylinders which to alternating sides of said pistons define material discharge and accumulation zones, said motor means including single hydraulically operated cylinder driving said pistons to change direction of movement thereof simultaneous with shifting of said spool valve means.

6. The metering system of claim 1 wherein said system is closed to atmosphere except for said delivery means and said material supply means is pressurized.

7. A multi-channel metering system comprising a material supply, bi-directional multi-channel pump means, motor means to motivate said multi-channel pump means to feed material from said supply to a delivery nozzle associated with a channel of each of said multi-channel pump means at a substantially uniform rate, each channel of said multi-channel pump means having at least two chambers, one of said chambers being at one end of said pump means and the other being at an opposite end of said pump means, said multi-channel spool valve means placing one of said chambers of each channel of said pump means in communication with said material supply while placing the other of said chambers in communication with said delivery nozzle associated with said channel of each of said pump means.

8. The metering system of claim 7 wherein spool valve control means is provided to alternate the communicative condition of each of said chambers by shifting said spool valve means simultaneously with an automatic change of direction of said multi-channel pump means.

References Cited by the Examiner
UNITED STATES PATENTS

| 2,019,202 | 10/1935 | Taylor | 222—330 |
| 2,034,921 | 3/1936 | Phillips et al. | 222—255 |
| 3,082,917 | 3/1963 | Anderson et al. | 222—334 |
| 3,193,156 | 7/1965 | Egee et al. | 222—255 |

FOREIGN PATENTS 880,428   6/1953   Germany.

ROBERT B. REEVES, *Primary Examiner.*

HADD S. LANE, *Examiner.*